3,300,256
OIL PAN-TO-BEARING CAP SEAL

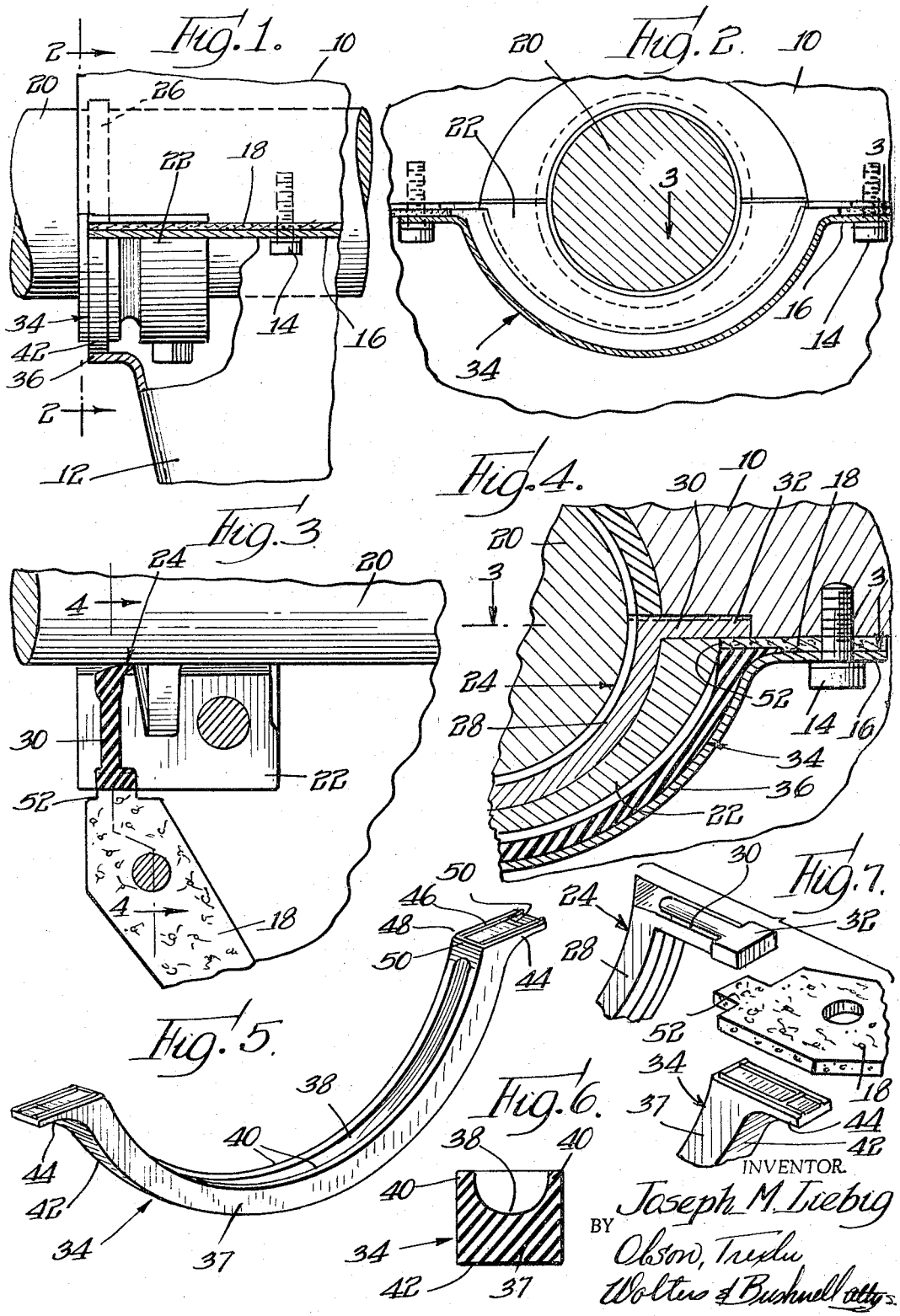

Joseph M. Liebig, Wheaton, Ill., assignor to Illinois Milling, Inc., Chicago, Ill., a corporation of Illinois
Filed Oct. 7, 1963, Ser. No. 314,419
4 Claims. (Cl. 308—23)

This invention relates to a rear main bearing-to-oil pan seal for an automotive engine.

It has been a custom for quite some time to seal the oil pan of an engine to the block by means of a cork gasket. A seal must also be provided for the rear main bearing, and for many years, this consisted of oakum in a groove between the shaft and the rear bearing cap and the overlying portion of the block. Recently, work has been done toward replacing the oakum with a two-piece or split seal of synthetic rubber, generally with a steel or the like reinforcement.

In addition to the foregoing, some means must be provided for sealing the bearing cap of the rear main bearing to the oil pan. Attempts have been made to effect such a seal with a semicircular rubber ring having a more or less circular cross section squared off at the inner diameter. Such rings have not proved entirely satisfactory, inasmuch as the rear end of the pan has been supposed to contact the highest portion of the seal. Oil pans are not held to particularly close manufacturing tolerances, comprising simply sheet metal stampings, and a short pan has left an opening of greater or lesser degree between the pan and the seal, thereby allowing oil to leak out.

It is an object of this invention to provide an improved oil pan-to-bearing cap seal.

It is a further object of this invention to provide a pan-to-bearing cap seal which is designed to seal a pan of a particular length, but which will efficiently seal also with a long or a short pan.

It is a further object of this invention to provide such a seal having provision for taking up radial tolerances, and providing for the inherent swelling of rubber when hot.

Yet another object of this invention is to provide a seal of the character heretofore described having improved structure for sealing cooperation with the usual cork pan gasket.

Other and further objects and advantages of the present invention will be apparent from the following description when taken in connection with the accompanying drawings wherein:

FIG. 1 comprises a longitudinal sectional view showing the cooperation between my improved seal, an oil pan, and a rear main bearing cap;

FIG. 2 is a vertical cross-sectional view taken substantially along the line 2—2 of FIG. 1;

FIG. 3 is a horizontal longitudinal sectional view taken substantially along the line 3—3 in FIGS. 2 and 4;

FIG. 4 is an enlarged cross sectional view taken along the line 4—4 in FIG. 3;

FIG. 5 is a perspective view of a seal construction in accordance with the principles of this invention;

FIG. 6 is a cross sectional view through the seal; and

FIG. 7 is an exploded perspective view showing the cooperation of the present seal with the rear main bearing seal and the pan gasket.

Referring now in greater particularity to the drawings, and first to FIGS. 1–4, there will be seen the rear portion of the block 10 of an automotive engine having an oil pan 12 secured therebeneath by means of cap screws 14 passing through a peripheral flange 16 on the oil pan and threaded into the block. A cork gasket 18 is compressed between the pan flange 16 and the block in accordance with conventional practice.

The engine is provided with the usual crankshaft 20 journalled in suitable bearings (not shown) including a rear main bearing within a rear bearing cap 22 bolted to the underside of the block. A bearing seal 24 is provided between the shaft 20 and the block 10 and bearing cap 22. The bearing seal comprises an upper semicylindrical or semicircular section 26 received in a groove in the block, and a lower semicircular portion 28 received in a groove in the bearing cap. Details of the seal as heretofore described can be found in my Patent No. 3,106,406, issued October 8, 1963, for "Oil Seal."

Furthermore, as set forth in my copending application, Serial No. 117,153 for "Oil Seal" filed June 14, 1961, the lower semicircular seal portion 28 is provided with substantially diametrically extending arms 30 having transverse lugs 32 at the outer ends thereof. Each arm 30 is received in a suitable groove between the block 10 and bearing cap 22 with the lug 32 extending radially beyond the bearing cap.

In addition to the foregoing, provision is made for sealing the oil pan to the rear main bearing cap. More particularly, a generally semi-circular seal 34 is compressed between the rear portion of the bearing cap 22 and a rearwardly extending lip 36 on the oil pan 12 forming a continuation of the peripheral flange 16 thereon. As may be seen particularly in FIGS. 5 and 6, the seal 34 comprises a semicircular body 37 having a rectangular cross section, but with a semi-circular groove 38 along the inner portion thereof, providing a pair of ribs or flanges 40 which abut the outer surface of the bearing cap 22. The outer surface of the seal body is cylindrical, as indicated at 42.

At the upper ends of the body, the seal is provided with laterally extending ears designated generally by the numeral 44. Each ear is provided with a generally flat upper surface 46, with longitudially spaced, radially extending sealing ribs 48 thereon. Each upper ear surface 46 also is provided with short longitudinally extending ribs 50. As will be seen from FIGS. 3, 4 and 7, the cork gasket 18 is provided with a tab 52 which underlies the lug 32 of the rear main bearing seal 24. The adjacent ear 44 of the seal underlies the cork gasket 18 and each tab 52 thereof, and presses the corresponding tab 52 up against the underside of the lug 32. The radial ribs 48 crowd the cork tab, thereby to afford a tight fit and a good seal.

As will be seen in FIG. 1, the cylindrical outer surface 42 of the seal 34 engages the lip 36 of the pan, which is likewise cylindrical. The longitudinal position (axially of the crankshaft) of the rear edge of the lip 36 may vary quite substantially, while still maintaining a surface engagement between the lip and the outer cylindrical surface of the seal. Thus, the pan (and hence the lip) can be quite short of its nominal length (as shown in FIG. 1) and still form a good seal. Of course, if the pan and lip are long, a good seal is still formed, as will be apparent.

In order to accommodate for variations in radial positioning of the lip 36, the seal is intended to be compressed radially, and the ribs 40 provided by the groove 38 take up compressive forces for such a fit. Furthermore, rubber swells when it is hot, and these ribs 40 take up such swelling.

The specific example of the invention herein shown and described is for illustrative purposes only. Various changes in structure will no doubt occur to those skilled in the art, and will be understood as forming a part of the present invention insofar as they fall within the spirit and scope of the appended claims.

The invention is claimed as follows:

1. In combination with an engine having a block, a bearing cap, an oil pan having a peripheral flange thereon including an arcuate lip positioned adjacent said bearing cap, and an oil pan gasket between said flange and said block; an oil pan-to-bearing cap seal comprising an arcuate body positioned between said lip and said bearing cap, a pair of radially extending ears connected to opposite ends of said arcuate body for compressively engaging said oil pan gasket, and a main bearing seal having a pair of radially extending arms extending between said bearing cap and said block, said radially extending arms, said oil pan gasket, and said ears compressively engaging one another.

2. The combination as set forth in claim 1 wherein the seal ears are provided on the upper surface with rib means impinging against the oil pan gasket.

3. A seal member in an engine having a block, a main bearing and a main bearing seal, a cap for the main bearing and seal, an oil pan having a peripheral flange including an arcuate lip adjacent said bearing cap, and an oil pan gasket between said flange and said block, said seal member comprising; an arcuate body portion positioned between the lip of said oil pan and said main bearing cap, said arcuate body portion including a first outer surface positioned in sealing engagement with an inner surface of said oil pan lip and a second inner surface means positioned in sealing engagement with said main bearing cap, and a pair of radially outwardly extending ears connected to said arcuate portion and in engagement with a first surface means of said oil pan gasket to press a second surface means of said oil pan gasket into sealing engagement with a portion of said main bearing seal, whereby a fluid-tight joint is formed between said oil pan, bearing cap, and main bearing seal.

4. A seal member as set forth in claim 3 wherein said second inner surface means includes spaced-apart rib means interconnected by a concave groove means, said rib means being compressible to resiliently accommodate compressive forces on said seal member.

References Cited by the Examiner
UNITED STATES PATENTS

| | | | |
|---|---|---|---|
| 2,209,230 | 7/1940 | Kosatka | 271—166 |
| 2,914,038 | 11/1959 | McKellar | 277—58 |
| 3,003,799 | 10/1961 | Marchionda et al. | 277—206 |
| 3,202,463 | 9/1965 | Fatt | 308—23 |

MARTIN P. SCHWADRON, *Primary Examiner.*

FRANK SUSKO, *Examiner.*

DAVID J. WILLIAMOWSKY, *Assistant Examiner.*